United States Patent

Eberle et al.

[11] 3,769,476
[45] Oct. 30, 1973

[54] SWITCH DEVICE FOR INDICATING PRESENCE OF A LOAD ON THE SEAT OF AN AUTOMOTIVE VEHICLE

[75] Inventors: Dieter Eberle, Tamm, Wurttemberg; Dieter Hanselmann; Hans Prohaska, both of Bietigheim, Wurttemberg, all of Germany

[73] Assignee: SWF-Spezialfabrik Fur Autozubehor Gustav Rau GmbH, Postfach, Bietigheim, Germany

[22] Filed: Apr. 13, 1972

[21] Appl. No.: 243,672

[30] Foreign Application Priority Data
Apr. 20, 1971 Germany............ G 71 14 939.8

[52] U.S. Cl. ............................. 200/85 A, 340/278
[51] Int. Cl. ............................................. H01h 3/14
[58] Field of Search ............... 200/85 R, 85 A, 61, 200/58 B; 340/278; 307/105 B

[56] References Cited
UNITED STATES PATENTS
3,437,993  4/1969  Recio et al.......................... 340/278

Primary Examiner—David Smith, Jr.
Attorney—John J. McGlew et al.

[57] ABSTRACT

The switch device is used with a resilient automotive vehicle seat having a spring suspension, and is in the form of a pull switch having a housing and an actuating member movable relative to the housing. Hooks on the housing and on the actuating member connect the pull switch between two points on a part of the spring suspension which expands when the seating surface of the seat is loaded. Clamps may be provided to secure the hooks against displacement along the spring suspension part.

5 Claims, 2 Drawing Figures

PATENTED OCT 30 1973　　3,769,476

SWITCH DEVICE FOR INDICATING PRESENCE OF A LOAD ON THE SEAT OF AN AUTOMOTIVE VEHICLE

BACKGROUND OF THE INVENTION

In order to increase the safety of persons riding in a vehicle, it has been suggested to provide to the driver, before he starts the vehicle, a signal indicating whether or not a passenger has occupied a passenger seat but has not fastened the safety belt. In order to produce such a signal, it is necessary to provide a switch device which is actuated when the surface of a vehicle seat carries a load.

The vehicle seat generally is constructed on a seat frame, in the form of a rigid member, to which the seat is secured as a unit. The entire assembly is secured to the floor of the vehicle. A spring suspension, with upholstery and a seat cover, is mounted on the seat frame to serve as a seating surface.

SUMMARY OF THE INVENTION

The present invention is directed to such a switch device for indicating the presence of a load on the seating surface of a seat in an automotive vehicle.

An object of the present invention is to provide a switch device for a vehicle seat and which is reliably actuated when the seating surface is loaded even if the loading is uneven. The switch device of the invention has a simple design and may be added to already existing vehicle seats.

In accordance with the present invention, a switch device, for indicating the loading of the seating surface of an automotive vehicle seat, is provided in the form of a pull switch having its housing and its actuating member connected, on the underside of the resilient seat, to a part of the spring suspension of the seat which expands when the seat is loaded.

The resilient seat sags when loaded, and the spring suspension on the underside of the seat expands. This expansion of the spring suspension of the seat is utilized for the direct actuation of a pull switch, which has its housing and its actuating member secured to two points of the spring suspension. The pull switch may include make contacts, break contacts or changeover contacts, depending on the associated indicating circuit.

The connection of the pull switch to the spring suspension is achieved in a simple manner, since the switch housing and the actuating member of the pull switch are formed with hooks, and the pull switch is attached, by means of these hooks, to two points of the spring suspension. The spacing between the hooks is adapted to the spring suspension, so that the pull switch, mounted in the spring suspension, assumes an unactuated switching position as long as the seating surface is not loaded.

In accordance with a further feature of the present invention, the sensitivity of the switch device is improved by locating the pull switch in the center of the spring suspension. The switching device then responds reliably even with slight loading of the seating surface as, for example, by a child.

In one embodiment of the switch device of the invention, the spring suspension is composed of undulating spring wires, and the pull switch is hooked between two relatively opposed parts or legs of a spring loop.

Since the sagging of the seating surface varies greatly, considerable variation in the distance between the engagement points of the pull switch on the spring suspension of the seat may occur. In addition, considerable manufacturing tolerances, and deviations due to the aging of the seat, have to be taken into consideration. Since these changes cannot be absorbed directly by a conventional pull switch, in accordance with a further feature of the invention at least one part of the pull switch is connected by means of a resilient component to the spring mounting of the seat. This resilient intermediate component then adapts to change in the distance between the suspension points of the pull switch to the restricted switching movement.

To assure that the points of suspension of the pull switch on the spring mounting do not shift during sagging movements of the seating surface, in accordance with the invention the engaging hooks of the pull switch can be firmly secured in position on the spring suspension of the seat by means of clamping members engaged with the spring suspension on both sides of each hook.

An object of the invention is to provide an improved switch device for indicating the presence of a load on the seat of an automotive vehicle.

Another object of the invention is to provide such a switch device which is reliably actuated when the seating surface is loaded even if the loading is uneven.

A further object of the invention is to provide such a switch device which has a simple design.

Another object of the invention is to provide such a switch device which may be added to already existing seats.

For an understanding of the principles of the invention, reference is made to the following description of a typical embodiment thereof as illustrated in the accompanying drawing.

DESCRIPTION OF THE PREFERRED EMBODIMENT

Figures 1, 2:
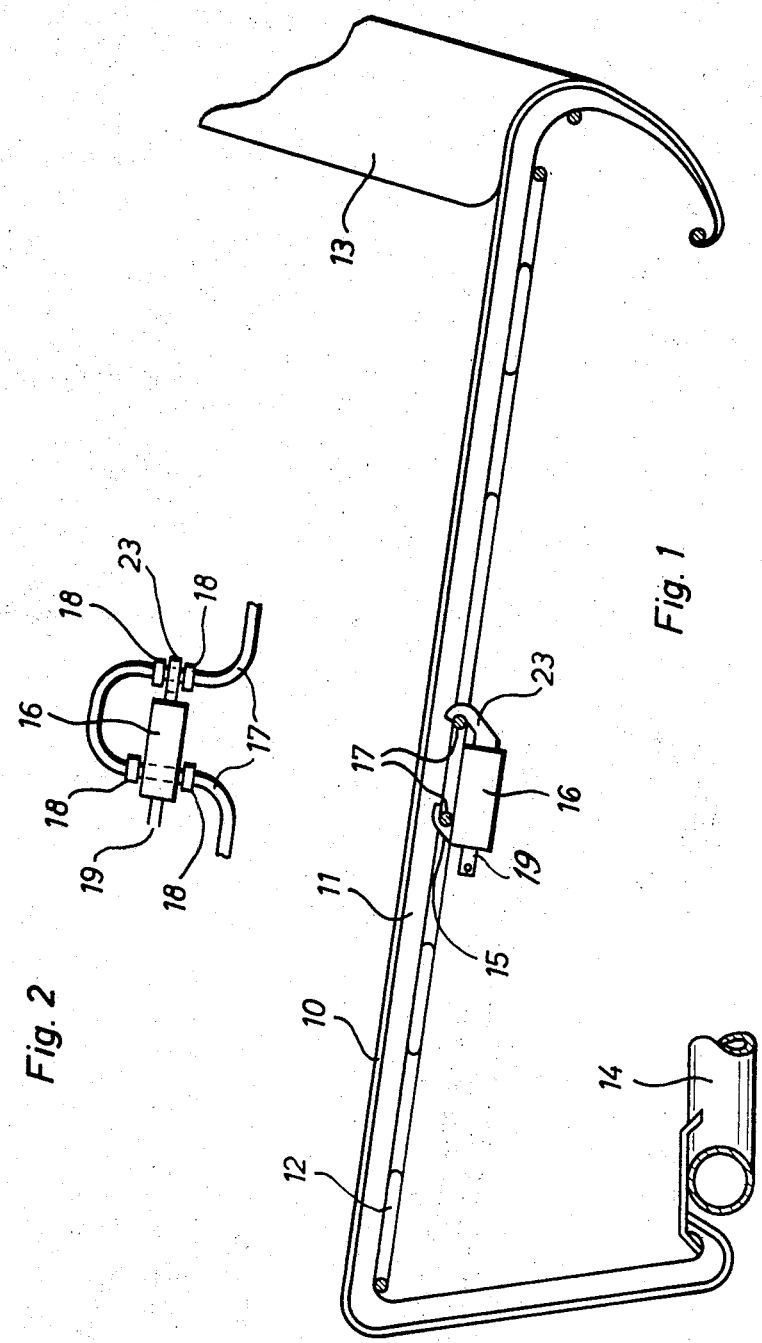
FIG. 1 is a side elevation view illustrating the mounting of the pull switch, embodying the invention, on the underside of an automotive vehicle seat.
FIG. 2 is a detailed view illustrating the clamping of the pull switch in position on the spring mounting of the seat.

As shown in FIG. 1, the seating surface of an automotive vehicle seat comprises a spring suspension 12, upholstery 11 carried by suspension 12, and a seat cover 10 covering upholstery 11. Spring suspension 12 is supported on a spring frame on a rigid seat frame 14, and the seat back 13 adjoins the rear edge of the seating surface. Spring suspension 12 extends over the underside of the seating surface, and is composed, as may be seen in FIG. 2, of undulating spring wires 17 which stretch across the spring frame and carry upholstery 11 and seat cover 10. When the seating surface is loaded, it sags to a certain extent and, at the same time, the undulations of spring suspension 12 expand. In the case of an undulating spring wire, with spring loops or bights 17, this means that the distance between relatively opposed parts or legs of a loop or bight is increased. This increase in the distance between two points of the spring suspension of the seat is utilized to operate a pull switch 16.

The housing of pull switch 16 has a hook 15, and the acutating member 23 of pull switch 16, which is moveable relative to the housing, is also formed as a hook. By means of these two hooks, pull switch 16 is attached directly to spring suspension 12, particularly to extend across a spring loop 17. The hook connection is so adjusted that pull switch 16 is not actuated when the seating surface is not loaded.

The connecting points of switch 16 to spring loop 17 can be fixed by clamping members 18, as shown in FIG. 2, which retain hooks 15 and 23 of the pull switch against displacement along the legs of spring loop or bight 17. The points of connection of pull switch 16 to the spring loop or bight 17 thus do not change when the seating surface sags, and the expansion of the spring suspension effects actuation of pull switch 16 which, through a suitable circuit, provides the vehicle driver with an indication of the loading. Pull switch 16 may be connected into such a circuit by virtue of the prongs 19 extending from the housing of the pull switch.

In order not to expand pull switch 16 excessively on the occurrence of very large changes in the spacing of the spring suspension 12, it may be necessary to secure at least one part of the pull switch, either the housing or the actuating member, to the spring suspension by means of a resilient intermediate component. This resilient intermediate component then adapts the changes in the length of the spring suspension to a fixed switching movement of pull switch 16, and thus prevents its destruction under such conditions.

While a specific embodiment of the invention has been shown and described in detail to illustrate the application of the principles of the invention, it will be understood that the invention may be embodied otherwise without departing from such principles.

What is claimed is:

1. A switch device for indicating the loading of the seating surface of an automobile vehicle seat with a switch fixed on the underside of the seat and which can be actuated dependently of the deflection of the seat suspension and which is attached to two parts of the seat suspension, comprising a switch having a housing, a hook secured to said housing, and adapted to engage one of the seat suspension parts, said switch having an actuating member which is movable to operate said switch and which is hook shaped, said switch hook shaped actuating member being engaged to the other part of the seat suspension.

2. A device for detecting the loading of a seat, comprising a seat having a substantially horizontally extending spring suspension including a spring loop with spaced apart resilient legs which deflect outwardly upon seat loading, and a switch adapted to be connected to an alarm circuit having a first hook adjacent one end engaged over one of the resilient legs and a second hook forming a switch actuating member adjacent its opposite end which is hooked over the other leg of the spring loop, said second hook actuating member being movable upon deflection of the resilient legs upon seat loading to actuate said switch.

3. A device according to claim 2 including a clamping member arranged on each side of said first hook and said second hook for holding the first and second hooks on said resilient legs.

4. A device according to claim 2 wherein said spring loop is located centrally of said horizontal spring suspension.

5. A device according to claim 2 wherein said spring suspension comprises a plurality of undulating spring wires forming individual spring loops and wherein adjacent resilient legs extend substantially parallel and said first and second hooks engage around said legs from respective opposite sides.

* * * * *